Fig.1

June 8, 1965    A. L. CROSBY ETAL    3,187,785
METHOD AND APPARATUS FOR MANUFACTURE OF ELECTRODES
Filed Nov. 2, 1959    11 Sheets-Sheet 4

INVENTORS
Alton L. Crosby, Marion S. DeLucia,
Stanley J. Gartner & Harold D. Losey
BY
Robert E. Strausser
ATTORNEY

June 8, 1965 A. L. CROSBY ETAL 3,187,785
METHOD AND APPARATUS FOR MANUFACTURE OF ELECTRODES
Filed Nov. 2, 1959 11 Sheets-Sheet 5

INVENTORS
Alton L. Crosby, Marion S. DeLucia,
Stanley J. Gartner & Harold D. Losey
BY
Robert E. Strausser
ATTORNEY June 8, 1965 A. L. CROSBY ETAL 3,187,785
METHOD AND APPARATUS FOR MANUFACTURE OF ELECTRODES
Filed Nov. 2, 1959 11 Sheets-Sheet 7

INVENTORS
Alton L. Crosby
Marion S. DeLucia
Stanley J. Gartner &
Harold D. Losey
BY Robert E. Strausser
ATTORNEY June 8, 1965 A. L. CROSBY ETAL 3,187,785
METHOD AND APPARATUS FOR MANUFACTURE OF ELECTRODES
Filed Nov. 2, 1959 11 Sheets-Sheet 8

INVENTORS
Alton L. Crosby, Marion S. DeLucia,
Stanley J. Gartner & Harold D. Losey
BY
Robert E. Strausser
ATTORNEY

United States Patent Office 3,187,785
Patented June 8, 1965

3,187,785
METHOD AND APPARATUS FOR MANUFACTURE OF ELECTRODES
Alton L. Crosby, Austin, and Marion S. De Lucia, Stanley J. Gartner, and Harold D. Losey, Emporium, Pa., assignors to Sylvania Electric Products Inc., a corporation of Delaware
Filed Nov. 2, 1959, Ser. No. 850,407
4 Claims. (Cl. 140—71.5)

This invention relates generally to the manufacture of electrodes for use in electron discharge devices and more particularly to a method and apparatus for the manufacture of grid electrodes.

Electron discharge devices generally comprise a plurality of electrodes arranged in spaced relation to one another. The operating characteristics of such devices are related to and controlled in part by the configuration of the internal electrode structures and by the accuracy or precision with which such structures are fabricated. The grid electrodes are particularly critical since certain important characteristics, for example, tube transconductance and noise level, are closely related to the size and spacings of the lateral grid wires which traverse the electron path. The spacings and configurations of the grid lateral wires is important not only with respect to each other but also with respect to the position of other electrodes in the assembly. In relatively low frequency tube applications it is possible to use lateral wires of sufficient cross-sectional area and strength to be at least partially self-supporting. In this case the lateral wire spacing is such that each turn of the helix of lateral wire could be affixed to the side rods. High frequency tube applications, however, require a high number of turns per inch of extremely fine lateral wire. Lateral wires of this size are normally too weak to be used in the previously employed mica-supported side rods structures. It is therefore necessary that an accurately fabricated rigid grid frame be employed. Further, the high number of turns per inch required prevents the use of conventional methods for securing the fine lateral wire to the side rod such as by notching and swaging.

The smallness of the electrodes and their close spacing within the completed device increase the heat dissipation problem and require the utilization of materials having high temperature-strength characteristics for the side rods and lateral wires. Use of hard materials such as molybdenum for the side rods and tungsten for the lateral wires normally creates intense problems of tool wear and the like, where the lateral wire helix is continually secured to the side rods of the grid supporting structure.

To overcome these problems the prior art suggests the use of the self-supporting frame upon which fine lateral grid wires are closely wound and continuously attached to the side of the frame by high temperature bonding techniques such as welding or brazing, or by the use of a fusable material such as glass frit.

From an electrical viewpoint, the grid electrodes made in accordance with the prior art suggestions appear to function satisfactorily; however, to date, the desired electrical characteristics have been purchased at a high cost resulting from a lack of manufacturing control and automatic fabricating apparatus and techniques. Thus it is an object of this invention to facilitate manufacturing control and automatic production of frame-type grid electrodes having a relatively large number of laterals per unit length of grid opening.

It is another object of this invention to facilitate the production of frame-type grid electrodes made from materials having high temperature-strength characteristics such as molybdenum and tungsten.

It is yet another object of this invention to improve the process of winding grid laterals about a rigid frame.

It is a further object of this invention to provide apparatus for the production of frame-type grids employing extremely fine lateral wire.

Briefly, in one aspect of the invention, an apparatus is provided for winding closely spaced turns of grid lateral wire about a frame which employs means for rotatively supporting a grid frame, means for supplying the lateral wire, means for securing the lateral wire to the grid frame, means for producing relative movement between the lateral wire supply means and the grid frame support to feed the lateral wire along the frame while the wire is being wound on the rotating frame, and means for securing the lateral wire to the frame at the completion of the winding operation. The lateral wire is thus secured to the frame only at the beginning and end of the helix. The lateral wire is maintained in position intermediate the secured ends of the winding by the frictional engagement of the lateral wire, under tension, and the side rods.

A typical grid which may be fabricated according to the teachings of this invention has a major of .158 inch, a minor of .0315 inch and is wound with 354 turns per inch of tungsten wire having a diameter of .0003 inch for a distance of .305 inch. The frame employs molybdenum side rods having a .0315 inch diameter.

For a better understanding of the invention reference is made to the following description taken in conjunction with the accompanying drawings in which.

Figure 1:
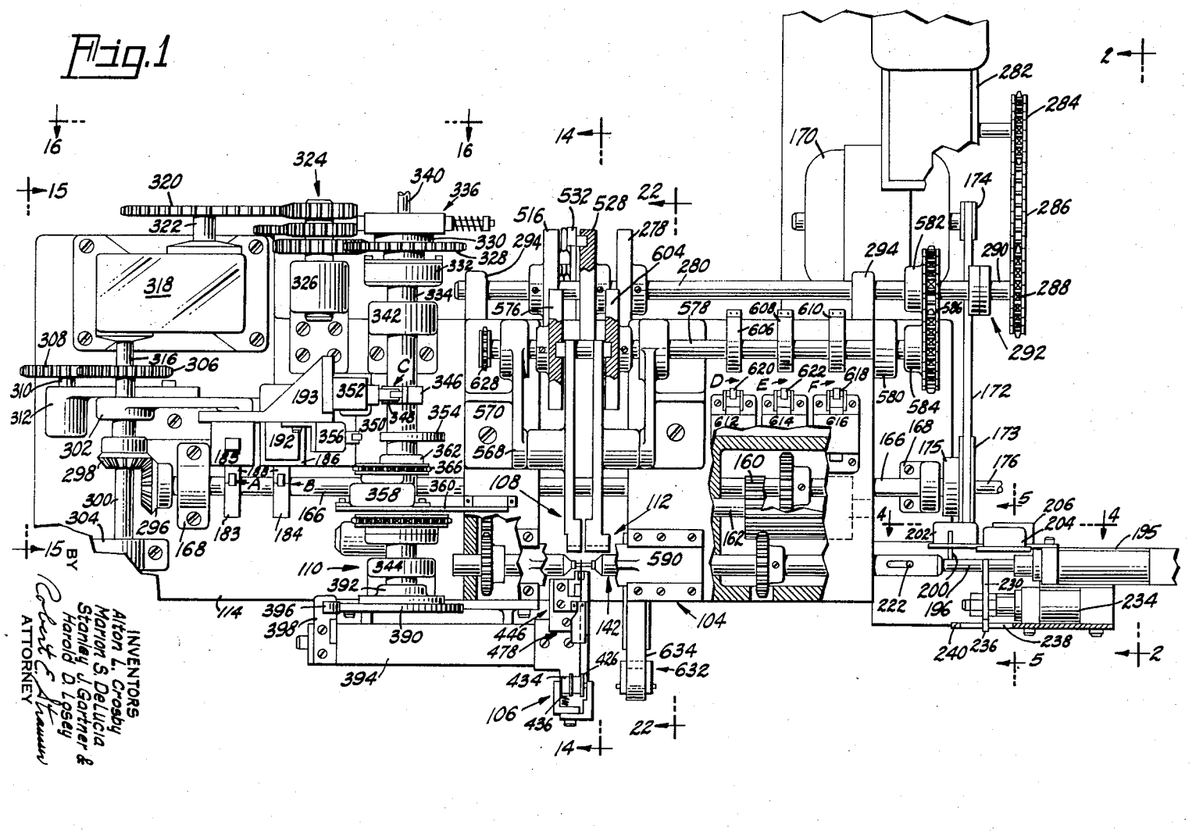
FIG. 1 is a plan view of the apparatus with some parts broken away and other parts in partial section showing the general arrangement of the apparatus.
Figure 6:
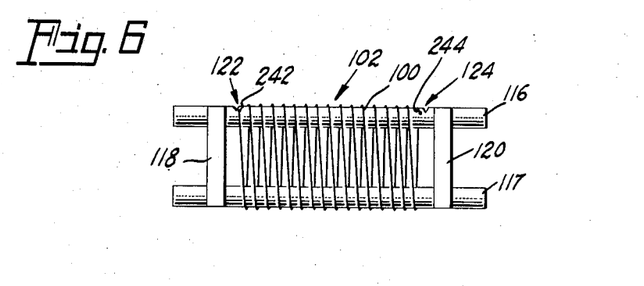
FIG. 6 is a plan view of a grid manufactured on the apparatus shown in FIG. 1.
Figure 7:
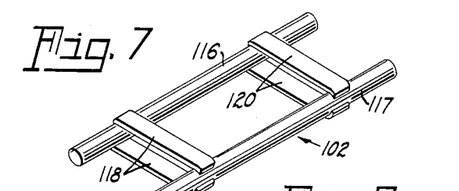
FIG. 7 is a perspective view of the frame employed in the production of the grid shown in FIG. 6.

Referring to FIGS. 1, 6 and 7, in one embodiment of the invention, an apparatus is provided for winding closely spaced turns of lateral wire 100 about a grid frame 102 comprising in combination, means 104 for rotatively supporting the grid frame, means 106 for supplying the lateral wire, means 108 for securing the lateral wire to the grid frame, means 110 for producing relative movement between the lateral wire supply means 106 and the grid frame support means 104 to feed the lateral wire 100 along the frame 102 while the wire is being wound on the frame, and means 112 for securing the lateral wire to the frame at the completion of the winding operation. The various means are arranged in operative relation on the apparatus frame 114.

Grid frame

The grid frame 102, upon which a helix of lateral wire 100 is to be wound, is formed from a pair of side rods 116, 117 which are connected together by first 118 and second 120 pairs of strap members. The straps may be secured to the siderods by conventional means such as welding. The lateral wire 100 is secured to the frame at the start 122 of the helix and at the termination 124 of the helix.

In the embodiment of the invention illustrated in the drawings the frame 102 has been fabricated prior to the winding operation. FIG. 6 illustrates a completed grid wherein the frame length between the straps 118, 120 is wound with a uniformly pitched helix of lateral wire. Grids having only a portion of their length may also be fabricated on this apparatus as well as grids having variable pitch as required for use in certain electron discharge devices.

Winding mandrel and spindles

The grid frame 102 is supported on a mandrel 126 during the winding operation. The winding mandrel, 126, closely approximates the interior configuration of the frame, being provided with semicircular grooves 128 to accommodate the side rods 116. The straps 120 abut a shoulder 130 formed on the mandrel when the frame 102 is threaded on the mandrel. The free end 132 of the mandrel has a taper formed thereon to expedite the loading of the frame. This taper also assists in centering and supporting the mandrel during the subsequent operations. Mandrel body 134 is provided with grooves in which the stripper pins 138 pass to remove the completed grid. The mandrel body 134 is mounted in a cavity 140 in a rotatively driven spindle 142. The tapered free end 132 of the mandrel 126 is supported by a receptor 144 held in a socket 146 in a second rotatively driven spindle 148 when the mandrel is advanced to the winding position at the workstation. This receptor is provided with a recess 150 in its free end in which the tapered mandrel end 132 is supported. A shoulder 152 on the receptor abuts the frame straps 118 to retain the frame in position on the mandrel.

Figure 2:
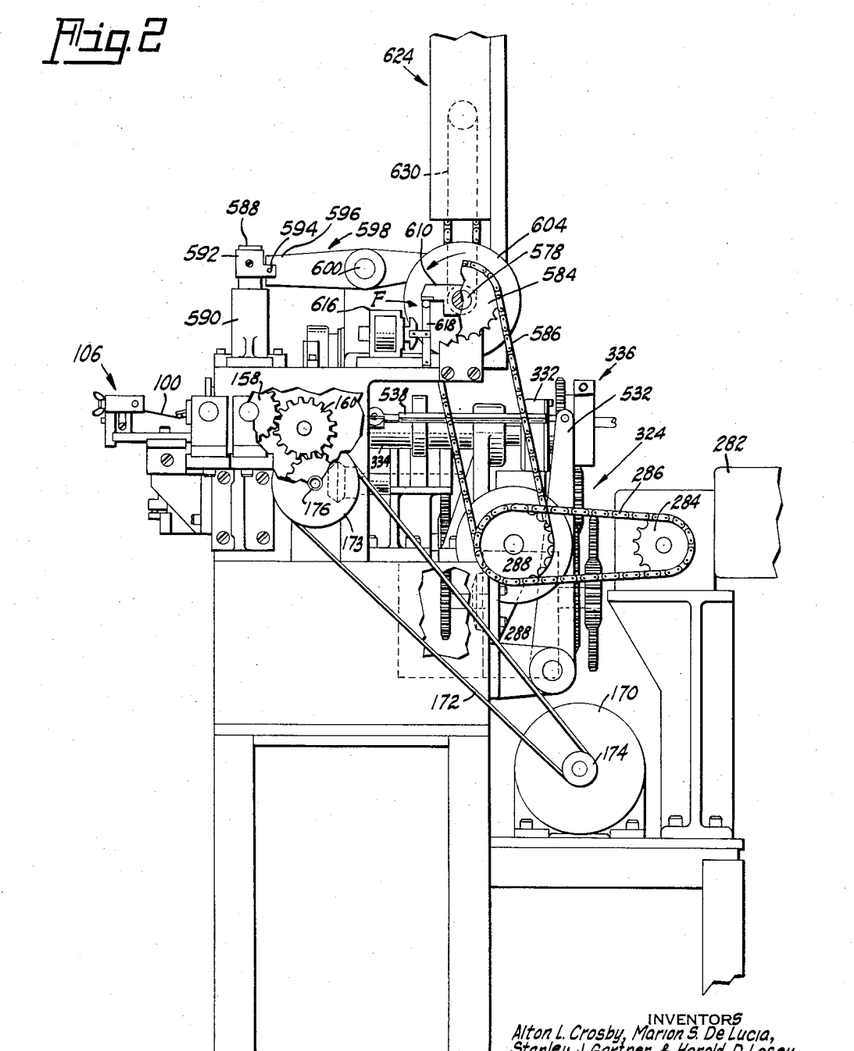
FIG. 2 is a side elevation of the apparatus of FIG. 1.
Figure 3:
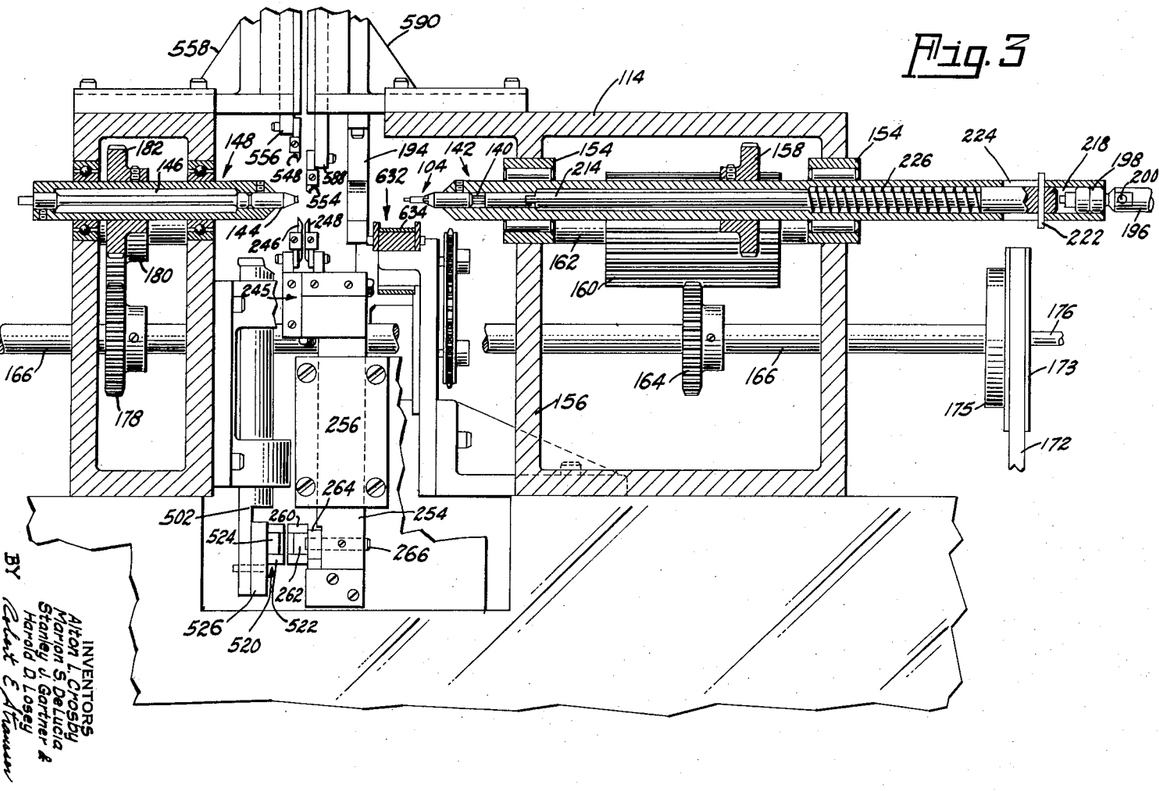
FIG. 3 is an enlarged front elevational view of a portion of the apparatus showing the rotatively driven spindle.

Referring to FIGS. 1, 2 and 3, the rotatively driven spindle 142 is slideably supported for longitudinal movement by bearings 154 in the apparatus frame 156. A gear 158 is affixed to the spindle, intermediate the bearings 154, in operative relation with an idler gear 160 mounted on shaft 162 which is journaled in the apparatus frame. The idler gear 160 in turn meshes with the spindle drive gear 164 affixed to the spindle drive shaft 166. The drive shaft 166 is supported by bearings 168 affixed to the platform 114. Variable speed spindle drive motor 170 rotates the spindle drive shaft through a belt 172 running between a pulley 173 on the spindle drive shaft 166 and a pulley 174 on the motor shaft. Fluid pressure operated clutch 175 is interposed between the pulley 173 and the shaft 166 and is connected by conduit 176 to a fluid pressure source, not shown. The second or fixed spindle 148 is driven by the spindle drive shaft 166 through drive gear 178 affixed to the drive shaft, a frame supported idler gear 180, and a gear 182 affixed to the spindle 148. The rotation of the spindles is synchronized since they are driven from a single shaft 166. Cam stops A and B, which include cams 183, 184 that are controlled by solenoids 185, 186 respectively, are affixed to the shaft 166 (see FIG. 15). Each of the cams 183, 184 is provided with a notched portion 187 into which a frame mounted spring loaded pivot arm 188 is moved to stop the rotation of the shaft 166 in a pre-selected position. The cam stops are each operated independently in a similar manner. The operation of cam stop A is controlled by solenoid 185 whose armature 190 is coupled to the lever arm 188. When the solenoid 185 is energized it will move the arm 188 out of the notch 187 thus releasing the shaft 166 for rotation. The armature of solenoid 186 which operates cam stop B performs an additional function in that it operates a switch 192. Solenoids 185, 186 are mounted on a bracket 193 affixed to the apparatus frame 114. During the grid notching, winding and plowing operations the movable winding spindle 142 is additionally supported by a yoke 194 affixed to the apparatus frame.

Figure 4:
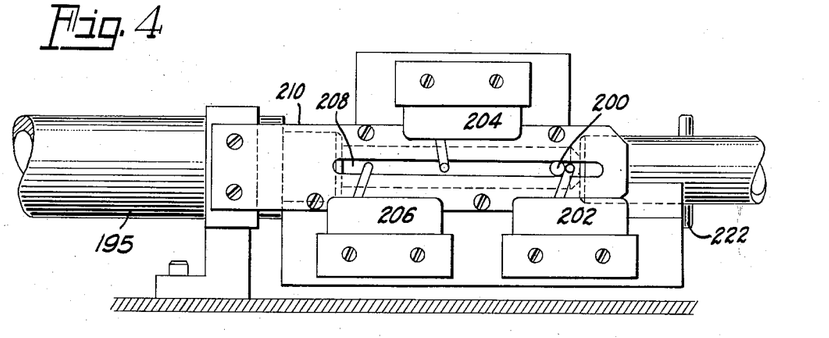
FIG. 4 is a side elevation of a portion of the spindle mechanism taken along the line 4—4 of FIG. 1.
Figure 5:
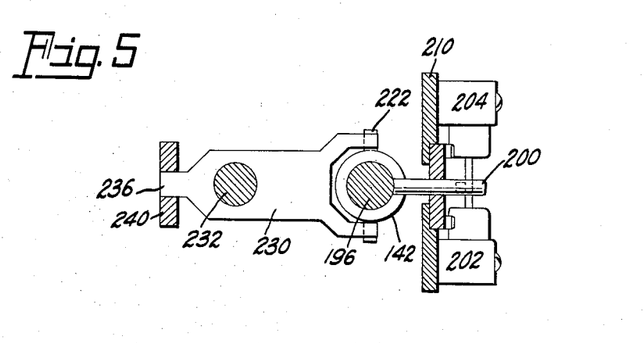
FIG. 5 is a cross section of a portion of the spindle mechanism taken along the line 5—5 of FIG. 1.

Referring to FIGS. 1, 3 and 4, reciprocation of the winding mandrel 142 from a retracted loading position to the advanced winding position at the workstation is produced by the operation of fluid motor 195. The ram 196 of the motor 195 is attached to the spindle 142 by a bearing connection 198 which allows the spindle to rotate while the ram is restrained from rotating. Pin 200 affixed to the ram operates three uni-directional limit switches 202, 204, 206 when the ram is reciprocated and prevents the rotation of the ram. These limit switches are all of the one way momentary contact type. The pin 200 passes through a slot 208 in the mounting bracket 210 on which the switches are adjustably positioned.

Stripper mechanism

Referring to FIGS. 1, 3, 5 and 11 the stripper pins 138 are secured at one end to a block 212 slideably contained within the winding spindle cavity 140. Stripper rod 214 is connected to the block 212 by a pin 216. The rod 214 terminates in a communicating interior cavity 218 of the spindle 142 (see FIG. 3). Stripper rod 214 is retained in position by a pin 222 which passes through slots 224 in the spindle 142. The return spring 226 retracts the stripper rod 214 when the pin 222 is released. The stripper pins 138 are actuated when the spindle 142 is retracted by a stripper bar 230 affixed to the ram 232 of the fluid motor 234 (see FIGS. 1 and 5). In its advanced position the bifurcated stripper bar 230 contacts the pin 222. The stripper bar 230 is positioned by the cooperation of an ear 236 on the bar and a slot 238 formed in the guide-plate 240.

Notching mechanism

Figure 26:
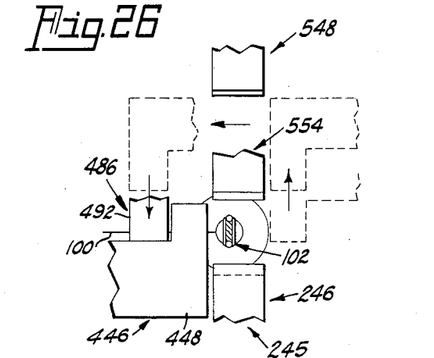

In the type of grid illustrated in FIG. 6, the lateral wire 100 is secured to the grid frame 102 only at the start 122 and end 124 of the wound helix. The wire is attached by notching the side rod 116, placing the wire in a notch 242, 244 (see FIGS. 26, 27) and plowing metal from the side of the notch in the side rod 116 over the lateral wire portion in the notch to anchor it in place (see FIG. 28).

The notches 242, 244 are formed at the workstation by a mechanism indicated generally at 245 of FIG. 3.

Figure 24:
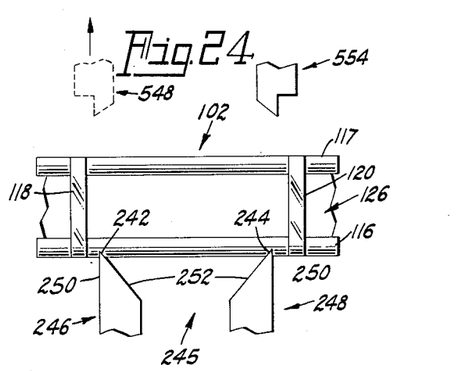
Figure 25:
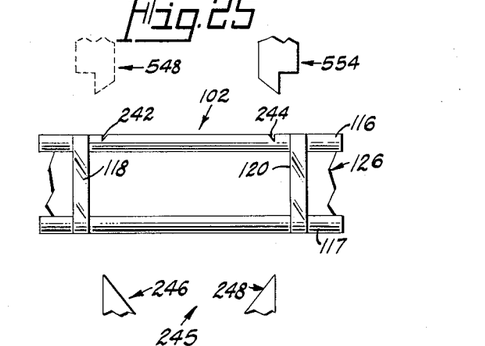

Referring to FIG. 24, the notching tools 246, 248 are identical, each being formed with one vertical surface 250 and an inclined cutting surface 252 to produce the notch shown. Other notch configurations can be produced, as desired, by changing the contour of the notching tools.

The notching tools 246, 248 are adjustably mounted on the upper end of a slide 254 (see FIGS. 3, 14) which is reciprocated in a slide way 256 supported by the apparatus frame 156. The position of the tools may be individually adjusted with respect to the grid frame 102. Reciprocation of the slide 254 is produced by the movement of a cam driven lever arm 258 having a bifurcated end 260 which slidably straddles a block 262 pivotally mounted on an L-shaped pivot arm 264. The arm 264 is itself pivotally mounted on the slide 254 about a pin 266. Position of the pivot arm 264 is controlled by an adjustable stop 268 carried by a plate 270 secured to the slide 254 and a spring 272 positioned between the lever arm 264 and a second plate 274 carried by the slide. Operating lever arm 258 is rocked about its pivot 276 by the action of the rotating notching tool cam 278 against cam follower 279 attached to the lever. The cam 278 is affixed to the lower cam shaft 280 which is driven (see FIG. 1) by gear motor 282 through a sprocket 284, chain 286 and sprocket 288 mounted on a shaft extension 290. Fluid pressure operated clutch 292 is interposed between the shaft extension 290 and the cam shaft 280 proper. The cam shaft 280 is rotatably supported by bearings 294 adjacent its ends and makes one complete revolution per grid.

Means for producing relative movement

Figure 15:
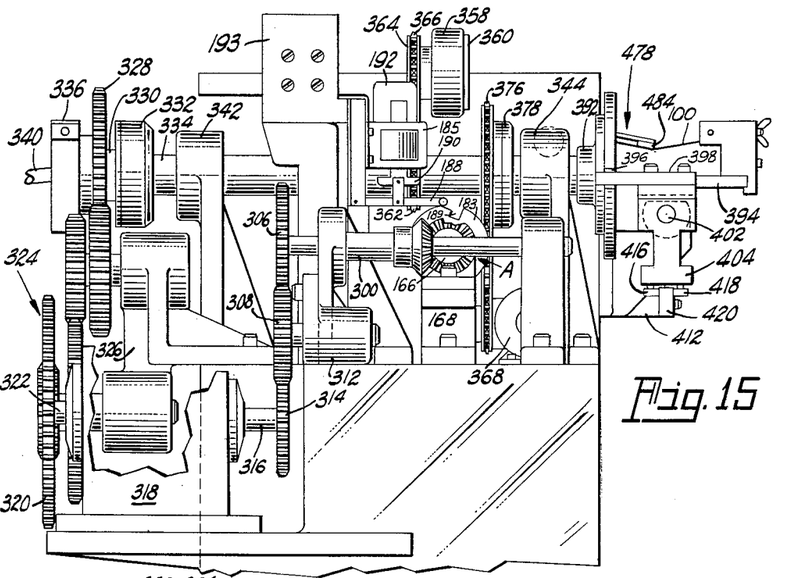
FIG. 15 is an end view elevation of the apparatus taken along the line 15—15 of FIG. 1.
Figure 16:
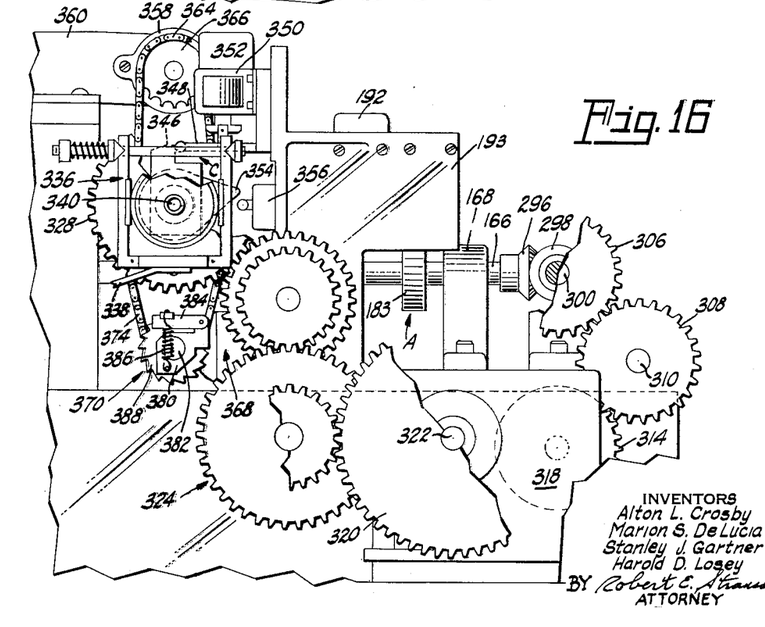
FIG. 16 is a rear elevation of the apparatus taken along the line 16—16 of FIG. 1.

Referring to the drawings, FIGS. 1, 15 and 16, the means 110 for producing relative movement between the lateral wire supply means 106 and the grid frame support means 104 derives its motive power from spindle drive shaft 166. A miter gear 296 on the spindle shaft 166 engages a gear 298 on shaft 300 which is supported by bearing members 302, 304. A gear 306 affixed to the end of shaft 300 meshes with an idler gear 308 mounted on shaft 310 which is positioned by bracket 312. Idler gear 308, in turn drives gear 314 attached to the input shaft 316 of a geared speed reducer 318. Gear 320 is affixed to the output shaft 322 of the reducer 318 and engages a change-gear train indicated generally at 324. The various gears in the train are arrayed on brackets 326 affixed to the apparatus and may be interchanged or replaced to vary the input to output ratio of the gear train. The output gear 328 of the train 324 is secured to a hollow shaft 330 which terminates in a fluid pressure operated clutch 332. The clutch 332 selectively connects shaft 330 with shaft 334 when energized. Friction brake 336, mounted on bracket 338, restrains the movement of shaft 330 to reduce the backlash incident to the use of change gear train 324. The clutch 332 is connected to a source of fluid pressure (not shown) through the shaft 330 by means of a conduit 340. Shaft 334 is supported by bearing members 342, 344 adjacent its ends.

Cam stop C (FIG. 16) has a cam 346 similar to cam 183 of cam stop A, previously described, secured to the shaft 334. The spring loaded stop arm 348, solenoid operator 350 and a solenoid armature operated switch 352 are mounted on bracket 193. Timing cam 354 is also affixed to the same shaft 334 and operates a switch 356 on bracket 193 when rotated by the shaft. Speed control servo potentiometer 358 for the spindle motor drive 170 is positioned on a bracket 360 above the shaft 334 and is connected thereto by a sprocket 362 on the shaft 334, sprocket chain 364 and sprocket 366 on the potentiometer.

Figure 18:
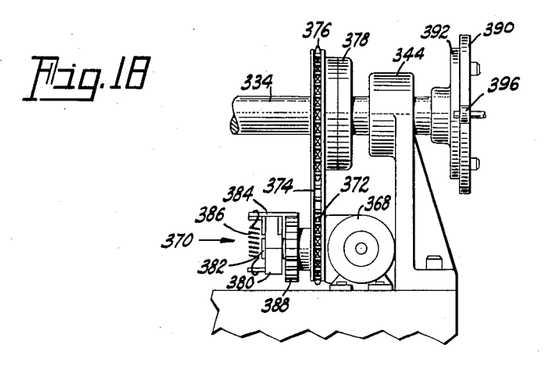
FIG. 18 is a partial elevational view taken from the side showing the return means for the feed cam of FIG. 17.

The feed cam return motor 368, whose function will be discussed later, is mounted on the platform 114 and connected to the shaft 334 through an over-running clutch 370, sprocket 372, chain 374, and sprocket 376 mounted on friction clutch 378 which is secured to the shaft 334 (see FIGS. 16, 18). The over-running clutch 370 comprises a body portion 380 secured to the return motor shaft 382, a pawl arm 384 pivotally affixed to the body 380, a spring 386 between the arm and the body, and a ratchet wheel 388 affixed to the sprocket 372. The sprocket 372 is free to rotate on the shaft 382 in one direction but the ratchet wheel 388 engages the pawl arm 384 when the sprocket is oppositely driven. The friction clutch 378 allows the sprocket 376 to rotate when driven while the shaft 334 is held against rotation by cam stop C.

Figure 17:
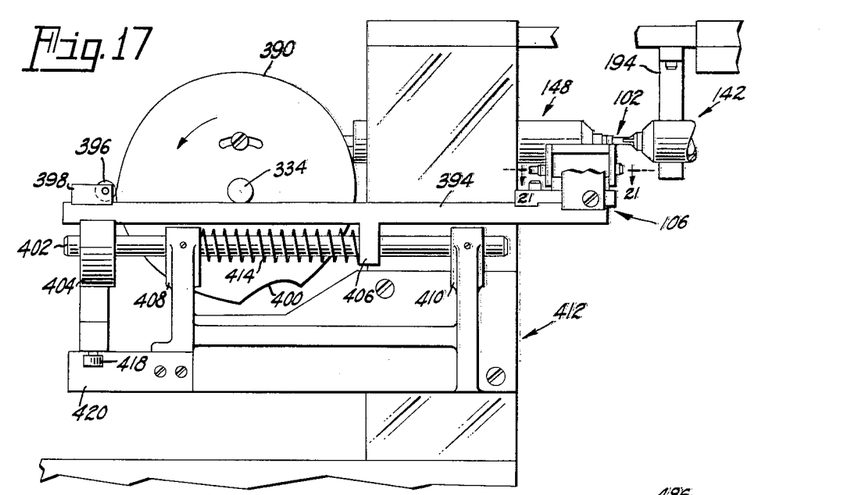
FIG. 17 is a front elevation of the apparatus showing the cam feed for the lateral wire supply.

Referring to FIGS. 1, 15 and 17, wire feed cam 390 is adjustably mounted on a collar 392 which is affixed to the end of shaft 334. The edge contour of the cam, which makes one revolution per grid, determines the movements of the wire supply slide 394 through a cooperating cam follower 396 affixed to the slide by arm 398. The cam periphery includes a rapid change in contour shown here as a notch 400 which is used to produce a more rapid than normal movement of the slide 394. Approximately 270 degrees of the cam periphery is used for positioning the lateral wire longitudinally along the frame during the winding operation, and the remainder is used to return the slide 394 to its starting position. The slide moves on a fixed shaft 402 which passes through bearing bosses 404 and 406. The shaft 402 is attached to arms 408, 410 of bracket 412 which is affixed to the apparatus frame. Cam follower 396 is held against the cam 390 by a spring 414 mounted about the fixed shaft 402 between the boss 406 on the slide and arm 408 on the bracket 412. Slide 394 is prevented from rotating about the fixed shaft 402 by a pair of rollers 416, 418, affixed to an extension of the boss 404, which straddle a guide rail 420 on the bracket 412.

Lateral wire supply

Referring to FIGS. 1, 2, 14, 17 and 19, the lateral wire supply means 106 is mounted on wire supply slide 394 by a support pedestal 422 which is affixed to a transverse member 424 secured to the slide. A spool 426 of lateral wire 100 is removably attached to and carried by a drum 428 on shaft 430 which is journaled in one end in the pedestal 422 and at the other end in a removable member 432. A friction brake wheel 434 is secured to the shaft 430 adjacent the drum 428. Brake lever 436 carrying felt pad 438 is pivoted at 440 on the pedestal. The felt pad is pressed against the wheel 434 by a spring 442 which reacts between a set screw 444 on the pedestal and the brake lever 436 above the pivot point of the lever. Set screw 444 enables adjustment of the degree of retardation of the rotation of the wheel 434 and hence the spool 426 of lateral wire on the drum. In this manner the tension on the lateral wire, as it is drawn off the spool during the winding operation, may be adjusted. The aforementioned structure allows the exchange of a full spool for an empty spool to be performed easily.

Wire guide and clamping means

Figure 14:
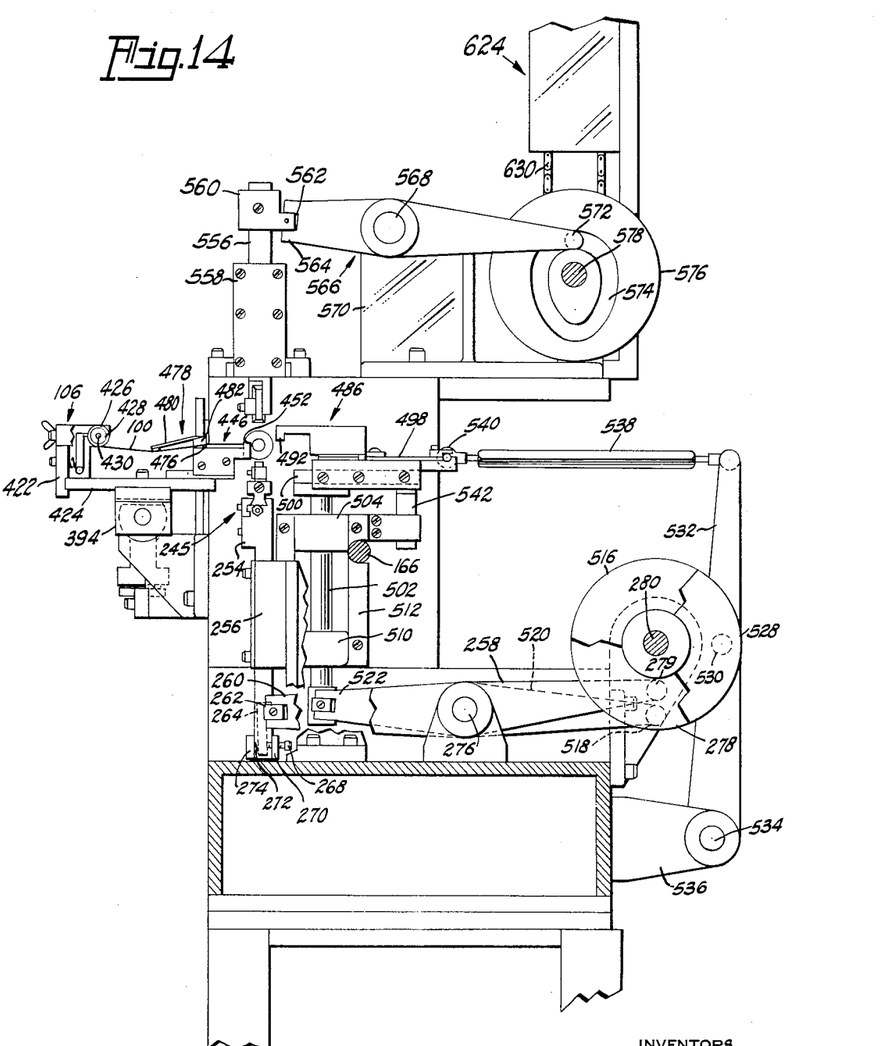
FIG. 14 is an elevational view of the apparatus taken along the line 14—14 of FIG. 1.
Figure 19:
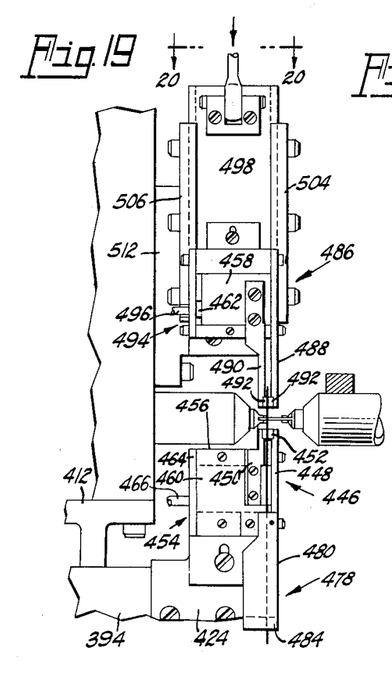
FIG. 19 is a plan view showing the wire threader, wire guide and clamping means.
Figure 21:
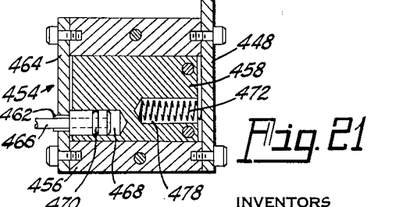
FIG. 21 is a sectional view taken along the line 21—21 of FIG. 17.
Figure 22:
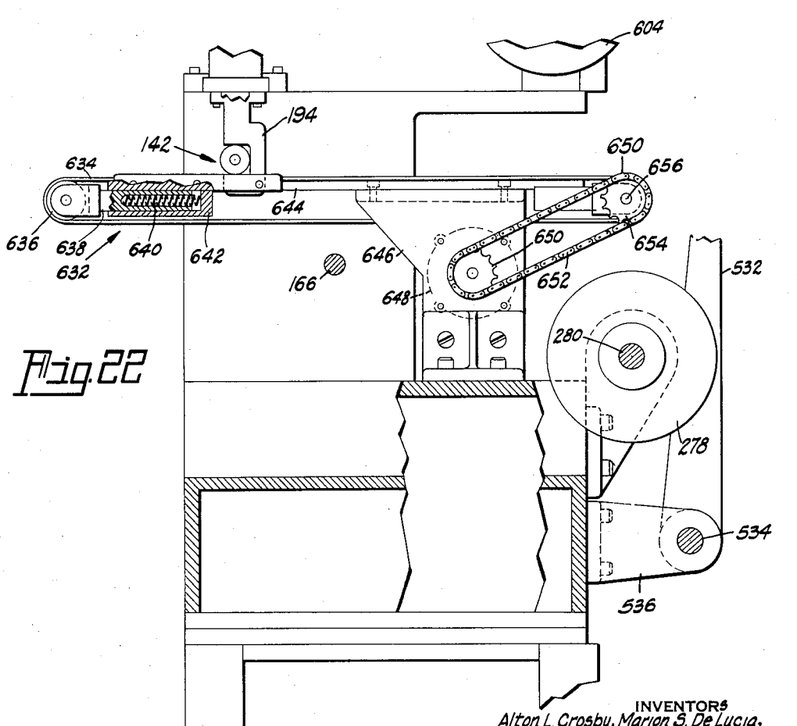
FIG. 22 is a cross-sectional view in elevation taken along the line 22—22 of FIG. 1.

It is necessary that the lateral wire 100 be positioned accurately on the grid frame 102 during the winding operation to insure the production of a satisfactory grid. In order to place the wire 100 in its proper position a wire guide means 446 is provided. The guide comprises a fixed finger or jaw 448 and a movable finger or jaw 450 (FIG. 19). Each of the fingers is provided with an extension 452 (see FIG. 14). The horizontal movement of the lateral wire 100 is limited when it passes between the slightly separated unclamped extensions 452 but it is free to move vertically. Operating means 454 are provided to clamp the wire 100 in place between the extensions 452 as required by the operation of the apparatus. The fixed finger 448 is secured to the body 456 of the clamping means 454 which is adjustably mounted on the transverse member 424 carried by the slide 394. The movable finger 450 is secured to a block 458 slidable beneath a cover plate 460 within the clamping means 454 (FIG. 21). Block 458 is caused to shift and thereby cause the wire 100 to be clamped or released between the extensions 452, by the application of the fluid pressure through a bushing 462 affixed to the side plate 464. The bushing 462 is connected at one end to a source of fluid pressure (not shown) by a conduit 466. The other end of the bushing 462 extends into a chamber 468 formed in the block 458. An O-ring 470 on the bushing 462 effectively prevents loss of fluid pressure. The block 458 is normally biased to an unclamped position by a spring 472 contained in a recess 474 in the block 458. The spring reacts between the block 458 and the fixed finger 448. Therefore, when fluid pressure is applied through the bushing 462 the block 458 will be moved closing the gap between the extensions 452 of the fingers 448, 450 and clamping the lateral wire 100 therebetween. The wire is guided over the body 456 of the clamping means by a member 476 affixed to the stationary portion of the clamping means (FIG. 14).

*Lateral wire vibration damper*

A lateral wire vibration damper 478 (FIGS. 1, 14, 19) is mounted on the body 456 of the wire guide clamping means 446 to reduce the vibration induced in the lateral wire 100 while being wound on the rotating grid frame 102. The damper 478 includes a reed-like member 480, preferably metal, mounted at one end on an inclined support block 482. A felt pad 484, which is normally in contact with the lateral wire 100, is affixed to the other end of the reed 480. The damper 478 is tuned to reduce the vibration of the wire 100 which would otherwise cause mis-spacing at certain winding speeds. The frequency of the oscillation induced in the lateral wire is dependent upon the rate of rotation of the frame or winding speed.

*Lateral wire threading means*

Lateral wire threading means 486 are provided to position the lateral wire 100 in the first notch 242 formed in the side rod 116. Referring to FIG. 19, the threading means 486 includes a fixed finger or jaw 488 and a movable finger or jaw 490, each provided with a vertical extension 492. Relative movement of the fingers is provided by a fluid pressure operated clamping means 494 similar in construction to the clamping means 454 used to operate the wire guide means 446. In the drawing (FIG. 19), the cover plate has been omitted so that the bushing 462 and block 458 may be seen. Fluid pressure is supplied to operate the clamping means through a conduit 496.

Figure 20:
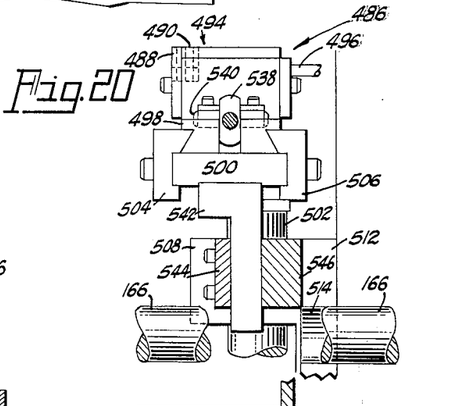
FIG. 20 is a rear elevation of the wire threader of FIG. 19.

The clamping means 494 is adjustably affixed to a slide 498 (FIGS. 14, 20). Slide 498 is carried by a platform 500 which is mounted on one end of a reciprocable shaft 502. The slide 498 is maintained on the platform 500 by gibs 504, 506 attached thereto. Shaft 502 is supported for reciprocatory movement by bosses 508, 510 which are formed as part of a support bracket 512. The bracket 512 is secured to the apparatus frame adjacent the spindle drive shaft 166, for which clearance groove 514 is provided. Reciprocation of the shaft 502 is produced by wire threader lift cam 516 on the lower cam shaft 280 acting through a cam follower 518 mounted on the end of a lever arm 520. The lever arm 520 is pivoted at 276. The other end 522 of the lever 520 is bifurcated and slidably straddles a pivot block 524 (FIGS. 3, 14) mounted on pivot arm 526 attached to the end of the shaft 502.

Advance and retraction of the slide 498 on the platform 500 is controlled by a wire threader feed cam 528 (FIG. 14) also mounted on the lower cam shaft 280. Cam follower 530 is attached at an intermediate point to the lever arm 532 which is pivoted at one end about a pin 534 held by a bracket 536 affixed to the apparatus frame. Connecting rod 538 is secured to the other end to the lever 532 and to a pin 540 affixed to the slide 498.

Rotation of the platform 500 about the shaft 502 is prevented by the provision of a member 542 which depends from the platform and is guided by arms 544, 546 affixed to the bracket 512. In this manner vertical and horizontal movement of the wire threader means 486 is possible during the production operation but rotation about the reciprocating shaft 502 is prevented.

*Plowing mechanism*

Figure 28:
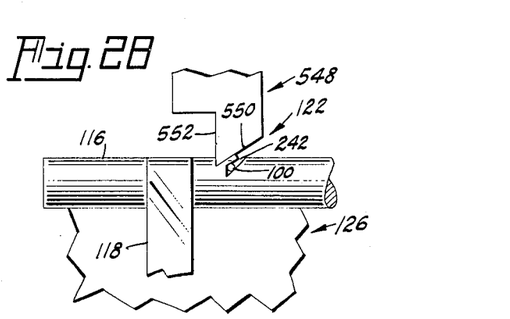

The lateral wire 100 is secured to the frame 102 at the start 122 and termination 124 of the grid winding. In the embodiment of the invention illustrated in the drawings, separate mechanisms are provided for closing the starting notch 242 and terminating notch 244 in the side rod 116 about the wire 100. Each of the notches is closed by plowing a portion of the external wall of the notch over the wire as it rests in the bottom of the notch. The tool configuration employed in this embodiment of the invention is best seen in FIG. 28 wherein the plowing tool 548 for closing the starting notch 242 is illustrated. The tool 548 is provided with an inclined surface 550 and a vertical surface 552 which cooperate to perform the plowing function when driven against the side rod. The tool 554 for closing the terminating notch 244 is similar in configuration to the plowing tool 548 but of the opposite hand (see FIG. 24). The plowing tool configuration employed is dependent upon the shape of the notch 242, 244 formed previously by the notching tools 246, 248, and may be varied to coincide therewith.

Referring to FIG. 3, the left or starting notch plowing tool 548 is adjustably secured to the end of a slide 556 carried in a slideway 558 on the apparatus frame. A cap 560, to which is affixed a pivot block 562 (see FIG. 14), is attached to the upper end of the slide 556. Pivot block 562 is slidably straddled by the bifurcated end 564 of lever arm 566. Lever arm 566 is pivoted at 568 on a bracket 570 secured to the apparatus frame. Cam follower 572 is mounted on the other end of the lever arm 566 and is positioned within the groove 574 of a constrained cam 576. The cam 576 is mounted on the upper cam shaft 578. The upper cam shaft 578 is journaled in the bracket 570 and in a support 580 (FIG. 1.) The lower cam shaft 280 and upper cam shaft 578 are coupled by a chain drive which comprises a sprocket 582 on the lower shaft 280, a sprocket 584 on the upper shaft 578, and a chain 586 therebetween. In this manner the shafts 280, 578 are driven in synchronism by the gear motor 282 and will each make one complete revolution per grid.

Referring once again to FIG. 3, the right or terminal plowing tool 554 is adjustably secured to the end of a slide 588 carried in a slideway 590 on the apparatus frame. The upper end of slide 590 bears a cap 592 to which is secured a pivot block 594 (FIG. 2). Pivot block 594 is slidably straddled by the bifurcated end 596 of a lever arm 598. The lever arm 598 is pivoted at 600 on the bracket 570. It has a cam follower 602 which is within the groove of constrained cam 604 mounted on the upper cam shaft 578.

The slideways 558, 590 may be repositioned on the apparatus frame to vary the relative position of the tools 548, 554 for other grid types and sizes. This adjustment may be used when the amount of change is greater than that which may be conveniently compensated for by individual adjustment of the tools themselves.

Three cam stops D, E, F, have their respective cams 606, 608, 610 secured to the upper cam shaft 578 intermediate the support 580 and the bracket 570. Their control solenoids 612, 614, 616 are mounted on the platform 114 adjacent the cam shaft 578. Cam stop F comprising cam 610, solenoid 616, and frame mounted spring loaded pivot arm 618 is most clearly seen in FIG. 2. Solenoid 612, through pivot arm 620, controls cam 606 of cam stop D· while solenoid 614 through its pivot arm 622 controls cam 608 of cam stop E.

A bank of timing switches 624 (not shown individually)

mounted on a bracket 626 are operated by the upper cam shaft 578 through sprocket 628 and timing chain 630 at a one to one ratio. These timing switches control portions of the machine's cycle but their particular arrangement and construction is secondary to the consideration of the invention herein described.

*Finished grid conveyor mechanism*

Conveyor 632 is positioned adjacent the retracted position of the movable winding sprindle 142 so that the completed grids will be deposited on the conveyor when stripped from the winding mandrel 126. The conveyor belt 634 is tensioned by an idler roll 636 mounted on a slide 638. Spring 640 is positioned in part within the slide 638 and reacts against the slideway 642. The slideway 642 is part of the conveyor support and guide 644 which is carried by a bracket 646. Bracket 646 which is affixed to the apparatus frame also carries the conveyor drive motor 648. The output of the motor is delivered to conveyor through a sprocket 650, chain 652 and sprocket 654 affixed to the drive roll shaft 656. Drive roll 658 is affixed to the shaft 656. The operation of the conveyor is coordinated with the apparatus cycle to deliver the completed grid to a receptacle, not shown, at the rear of the apparatus.

*Operation of the apparatus*

The description of the operation of the apparatus will follow a typical grid through the manufacturing process. At the start of the cycle sprindle drive motor 170 is rotating at low speed under the control of the servo potentiometer 358 on the arrested feed cam shaft 334. The spindles 142, 148 are kept from rotating by de-energized cam stop A on the spindle drive shaft 166. Clutch 175 on the drive shaft 166 is partially activated in that only a part of the full power generated by the motor 170 is transmitted to the spindle drive shaft 166. However, sufficient force is applied through the clutch to keep the cam 183 of cam stop A against the pivoted lever arm 188 of the de-energized solenoid 185. The cam shaft drive motor 282 is also rotating at this time. Clutch 292 allows application of partial force, by slipping engagement, to the cam shafts 280, 578 which are held against rotation by cam stop D. Sufficient force is transmitted by the clutch 292 to keep the cam 606 against the pivoted arm 620 of de-energized solenoid 612.

Figure 8:
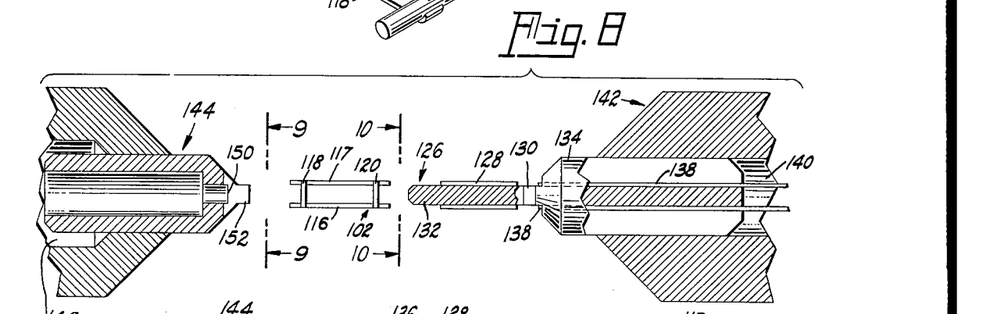
FIG. 8 is an elevation and partial section of the winding and support spindles shown with a frame prior to threading onto the mandrel.
Figure 9:
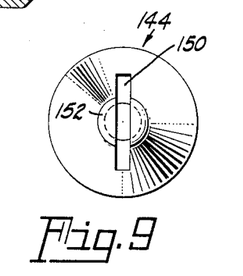
FIG. 9 is an end view of the supporting spindle taken along the line 9—9 of FIG. 8.
Figure 10:
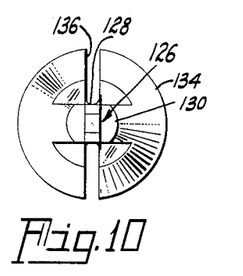
FIG. 10 is an end view of the mandrel and winding spindle taken along a line 10—10 of FIG. 8.
Figures 11, 12:
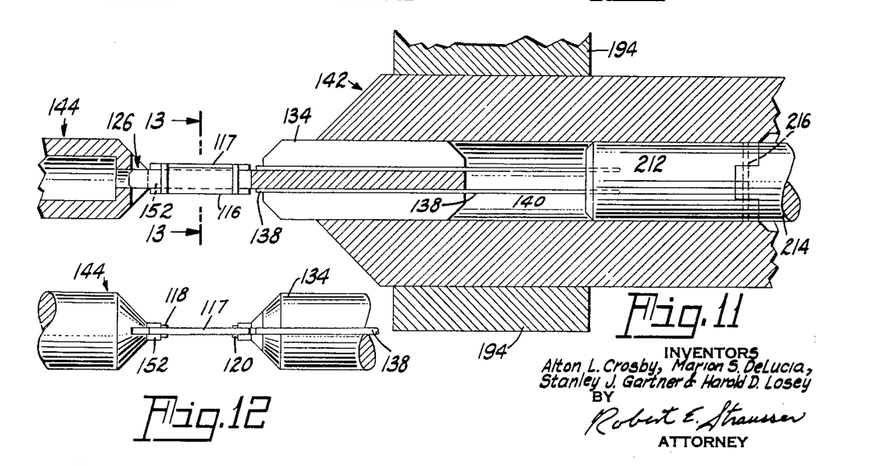
FIG. 11 is a front elevation similar to FIG. 8 showing the grid frame threaded onto the mandrel.
FIG. 12 is a plan view similar to FIG. 11.
Figure 13:
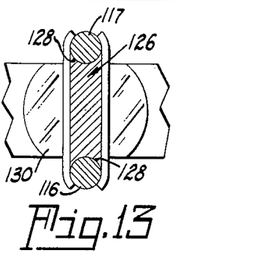
FIG. 13 is a view in section of the frame in position on the winding mandrel taken along the line 13—13 of FIG. 11.
Figure 23:
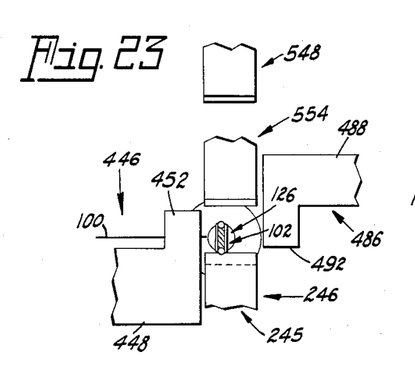
FIGS. 23–28 are sequential operational views of the production of grids on the apparatus of FIG. 1.

The winding spindle 142 is in its retracted position as is the stripper bar 230. The position of cam stop A is adjusted on the shaft 166 so that the winding mandrel is held with the major axis of the grid supporting portion of the mandrel vertical as shown in FIG. 3. The operator threads the frame 102 onto the winding mandrel 126 by aligning the side rods 116 with the grooves 128 and sliding the frame along the mandrel until the straps 120 abut the mandrel shoulder 130 (see FIG. 8). The next step in the cycle advances the winding spindle 142 to the workstation beneath the plowing tools and above the notching tools by applying fluid pressure to the spindle moving means 195. The tapered end 132 of the winding mandrel 126 enters the slot 150 in the receptor 144 carried by the left spindle 148. The advance of the mandrel is stopped when the end 132 is firmly seated in the receptor. The grid frame straps 118 abut the shoulder 152 on the receptor (FIGS. 11, 12) and the grid frame is thus accurately positioned. The movable spindle 142 is additionally supported, adjacent the workstation, by the yoke 194 to prevent the deflection of the spindle and subsequent movement of the mandrel as the various operations are performed on the grid frame. As the spindle 142 approached its most advanced position the pin 200 carried by the ram 196 of the spindle moving motor 195 tripped a momentary contact limit switch 202. This limit switch causes solenoid 612 of cam stop D to be energized freeing the cam shafts 280, 578 for rotation and fully activates the clutch 292 applying the force of the gear motor 282 to the shafts 280, 578. Therefore, rotation of the cam shafts 280, 578 is commenced (see FIG. 29). Movement of the lower cam shaft 280 rotates the notching cam 278 moving the notching tools 246, 248 to simultaneously form the starting and terminal notches 242, 244 respectively (see FIGS. 23, 24). The movement of the cam 278 is transmitted to the tool slide 254 by lever 258 which is rocked about its pivot 276. The position of the tools is adjusted to control the depth of the penetration of the tools into the side rod 116.

Figure 27:
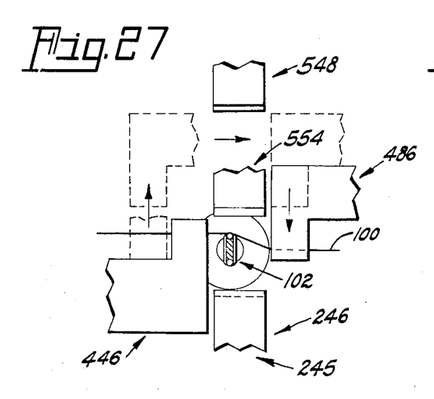

The bank of timing switches indicated generally at 624 is driven at a one to one ratio by upper cam shaft 578. As the cam shafts 280, 578 rotate, the individual switches are operated in sequence. After the notches have been made in the side rod and the notching tools have been withdrawn, a timing switch 624 (not shown individually) energizes solenoid 185 which releases cam stop A on the spindle drive shaft 166 and de-energizes solenoid 186 operating cam stop B on the same shaft. The similar cams 183, 184 are set 180 degrees apart about the shaft 166. This allows the winding mandrel 126 to be rotated 180 degrees, as shown in FIG. 27, before the drive shaft 166 is once again arrested. This positions the frame 102 with the notches 242, 244 uppermost (see FIG. 27) in position for the placement of the lateral wire 100. The de-energization of solenoid 186 also operates limit switch 192 which de-activates cam stop E on shaft 578 to arrest the rotation of the cam shafts when the notched portion of cam 608 is reached.

The lateral wire feed cam 390, which is driven by the spindle drive shaft 166, is held at its zero degree or starting position by de-energized cam stop C and partially activated clutch 332. Therefore, the wire guide and clamping means 446 is positioned opposite and close to the starting notch 242 formed in the grid frame 102. The lateral wire 100 is clamped between the extensions 452 of the fingers or jaws 448, 450 of the wire guide and clamping means 446 under the control of a timing switch (not shown individually). The wire threader lift cam 516 and wire threader feed cam 528 cooperate to move the threader 486 to a position where it may grasp the lateral wire 100 from the wire guide 446 and then position it in the first notch 242 (see FIG. 29). The threader is moved to the grasping position during the frame notching operation (see FIG. 21). As the lower cam shaft 280 rotates to perform the notching operations, the wire threader lift cam 516 raises the reciprocable rod 502 through the lever arm 520. This movement raises the wire threader 486 above the frame 102 (see FIG. 26). The wire threader feed cam 528 then moves the threader 486 across the grid frame after which the threader is lowered to the grasping position by the lift cam 516. At this time the fingers 488, 490 are opened by the action of the controlling timing switch 624 (not shown individually). As the threader descends the extensions 492 of the threader fingers 488, 490 are passed on each side of the wire 100 as it is clamped in the wire guide 446. The threader jaws 488, 490 are closed about the wire and then the wire guide jaws 448, 450 are opened. The opening and closing of the jaws of the threader 486 and guide 446 are controlled by the timing switches 624 (not shown individaully) to obtain the desired grasping and releasing sequence. At this time the rotation of the cam shafts 280, 578 is arrested, as previously described, by de-energized cam stop E and the 180 degree rotation of the notched frame takes place.

Figure 29:
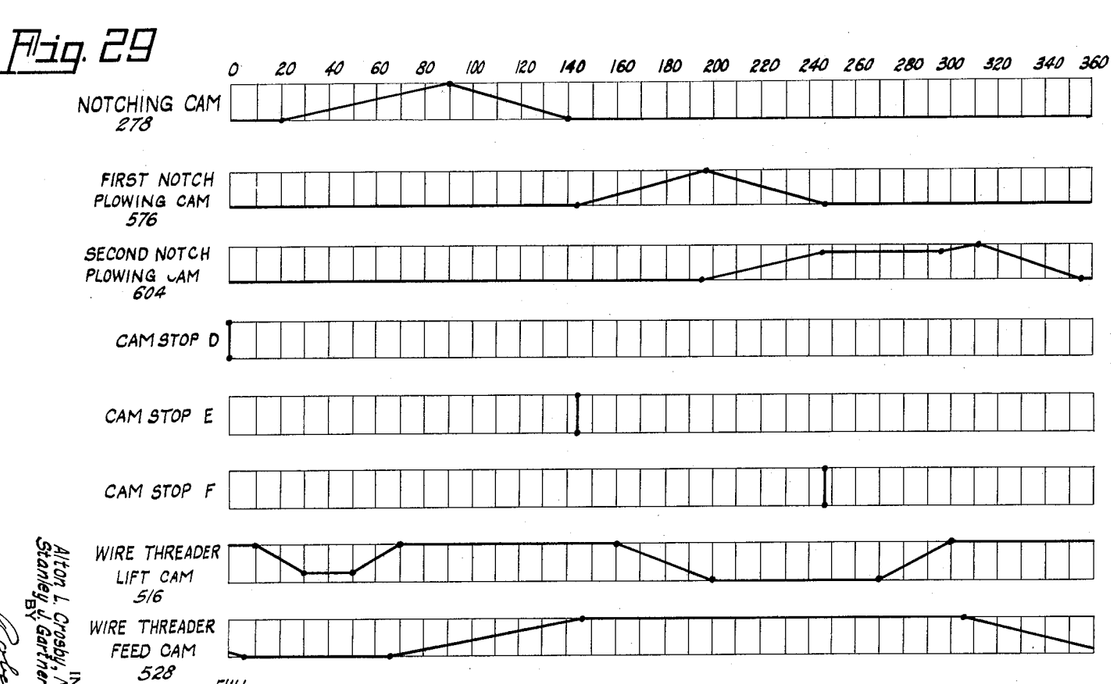
FIG. 29 is a timing chart indicating periods during which various cam operated means function.

After the frame 102 has been rotated 180 degrees, cam stop E is energized by a timing switch 624 (not shown individually) and the cam shafts 280, 578 rotate once again (FIG. 29). The rotation of the cam shafts causes the threader feed cam 528 and lift cam 576 to draw the lateral wire 100 across the frame 102 and move it downwardly, positioning the wire 100 in the starting notch 242. The first plowing tool 548 is then caused to descend from a rest position which allows clearance for movement of the threader 486 and secures the lateral wire 100 in the notch by closing the external wall of the notch over the wire as shown in FIG. 28. The descent and subsequent retraction of the plowing tool is produced by the cam 576 on the upper cam shaft 578. At this time the wire 100 extends between the clamped threader jaws, the frame 102 and the wire supply means 106 (see FIG. 27). Solenoid 186 is then energized by a timing switch 624 (not shown individually) releasing cam stop B so that the spindle drive shaft 166 is free to rotate. Energization of solenoid 186 also operates limit switch 192 to de-energize solenoid 616 thus stopping rotation of the cam shafts against cam stop F. Solenoid 350 is energized freeing cam stop C, thus allowing feed cam shaft 334 to rotate. Simultaneously, full pressure is applied to clutch 332 engaging feed cam shaft 334. Operation of solenoid 350 also activates limit switch 352 which permits application of full pressure to spindle clutch 175 bringing the latter from drag to positive engagement. Rotation of the grid frame causes the portion of the lateral wire 100 which was between the threader 486 and the frame 102 to be severed against the side rod 116 to which it has been secured. The tail of wire which extended between the frame and the threader 486 remains clamped in the threader jaws until removed later in the cycle by the momentary operation of the jaws.

Figure 30:
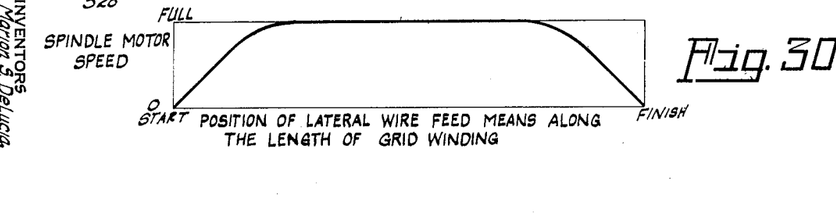
FIG. 30 is a representation of the spindle motor speed vs. position of the lateral wire feed means along the length of the grid winding.

The speed of rotation of the spindle drive motor 170 is fully controlled by the servo potentiometer 358 which is coupled to the feed cam shaft 334 and which makes one full revolution per grid cycle. The grid winding speed, i.e., speed of rotation of the grid frame, is controlled according to a trapezoidal speed versus length of grid winding curve (see FIG. 30). This has been found to produce unique results in that the wire 100 placement on the side rods 116, 117, at the start and end of the grid winding is more closely controlled, by reduction of vibration, in this manner. The slow starting and stopping speeds also allow the use of positive cam stops A, B to accurately position the grid frame.

The rotation of the feed cam 390 is coupled to the rotation of the spindles 142, 148 through the geared speed reducer 318, change gear train 324, and clutch 332. The contour of the cam 390 determines the pitch of the grid being wound. Changes in pitch may also be produced by utilizing the change gear feature.

A retarding force is applied to the drum 428 by the pivoted brake lever 436, as the lateral wire 100 is drawn from the spool 426 of the wire supply means 106. This retarding force tensions the extremely fine lateral wire 100 and also prevents backlash if the wire should break during the winding operation. The lateral wire extends from the spool 426 of the supply means to the frame 102 to which it is secured. It passes beneath the felt pad 484 of the vibration damper, over the rub rail 476 and between the slightly opened clamping extensions 452 of the guide means 446 (see FIG. 14). The wire vibration damper 478 is mechanically tuned to reduce the vertical vibrations generated in the wire as it is wound about the alternating side rods 116, 117 of the rotating grid frame 102. At relatively low winding speeds, the frictional engagement of the tensioned lateral wire 100 and the side rods 116 is sufficient to maintain the wire in position on the side rods. At the high winding speeds such as those employed in winding the center portion of the grid of the present embodiment, the vibratory movement of the undamped wire is believed to cause the wire to shift or bounce from its proper position on the side rods 116, 117. By tuning the vibration damper reed 480 the wire is kept from oscillating wildly and thus is held in position during the high speed portion of the winding operation.

Timing cam 354 on the feed cam shaft 334 is positioned to operate limit switch 356 as the last turn of the grid winding is wound into the terminal notch 244 on the frame 102. Limit switch 356 de-energizes cam stop B accurately arresting the rotation of the slowly moving grid frame 102 with the notches 242, 244 uppermost so that the terminal notch 244 may be closed about the lateral wire thus securing it to the frame. The terminal notch 244 is closed by the right plowing tool 554. The armature of solenoid 186 of de-energized cam stop B operates limit switch 192 when the stop arm 188, to which it is coupled, drops into the notch 187 in slowly rotating cam 184 on the spindle drive shaft 166. Limit switch 192 then energizes cam stop F freeing the cam shafts 280, 578 for performance of the last plowing operation. At this time feed cam clutch 332 is disengaged and cam stop C de-energized and ready to stop the rotation of the feed cam shaft 334 when it is returned to its zero degree or starting position.

The wire guide jaws are operated by a timing switch 624 (not shown individually) to cause the wire 100 to be securely clamped between the extensions 452 of the fingers or jaws 448, 450 before the last plowing operation occurs but when the wire is in the terminal notch. The cam shafts 280, 578 rotate to produce the plowing movement which secures the lateral wire in the terminal notch 244 by closing the external wall of the notch over the lateral wire. The cam shaft rotation is stopped after the plowing action by cam stop D. This is possible since limit switch 202 which originally energized solenoid 612 is of the one-way momentary contact type. The cam shafts 280, 578 have thus completed one revolution and are in position for the next cycle.

After the wire 100 has been secured to the grid frame, but prior to the arresting of the cam shafts 280, 578, a timing switch 624 (not shown individually) energizes the return motor 368 which is coupled through overrunning clutch 370 to the feed cam shaft 334. The overrunning clutch 370 permits the unimpeded rotation of the shaft 334 by the spindle drive shaft 166 while the return motor was inoperative. The clutch 370 now operates to couple the return motor 368 to the shaft 334 as the motor 368 operates. The shaft is rotated at a higher rate of speed by the return motor than when coupled to the spindle drive shaft 166. The lateral wire 100 which is secured to the frame is clamped in the wire guide 446 at this time. The more rapid rotation of the feed cam 390 which is due to the return motor 368 speed plus the depression 400 or change in contour of the cam periphery causes the wire guide 446 to move rapidly with respect to the grid frame 102. This rapid movement raises the tension of the secured wire above its breaking point. The wire breaks at its weakest point, at the outer edge of the terminal notch 244 of the grid winding, adjacent the frame 102. In this way the wire is severed from the frame while retained in the guide means 446 in position for the next threading operation. While this method of severing the lateral wire is preferable since it requires no additional elements, other embodiments of the invention may employ cutters for severing the lateral wire 100 adjacent the grid frame 102.

The return motor 368 continues to drive the feed drive shaft 334, after the lateral wire has been severed, until the de-energized cam stop C arrests its rotation at the zero degree or starting position. The slip clutch 378 on the shaft 334 then permits the return motor to continue rotating until the motor is de-energized by a timing switch 624 (not shown individually) although the shaft 334 is arrested.

Prior to the completion of the grid the stripper bar fluid motor 234, is energized by a timing switch 624 (not shown individually) moving the stripper bar 230 into its operative position. After the lateral wire has been severed a timing switch 624 (not shown individually) energizes the spindle moving means 195 to retract the winding mandrel 126 and spindle 142 from the workstation. Pin 222, which is connected to the stripper pins 138, is arrested by the stripper bar 230 as the spindle 142 is retracted. Continued movement of the spindle 142 creates relative movement between the arrested stripper pins 138 and the winding mandrel 134. The stripper pins 138 stop the movement of the completed grid as the mandrel 126 is withdrawn from within the grid. The grid then drops to the conveyor 632 positioned therebeneath which delivers it to a receptacle, not shown, at the rear of the apparatus.

Continued retraction of the spindle 142 causes pin 200 to operate a one-way momentary limit switch 204 which energizes cam stop D allowing the spindle drive shaft 166 to rotate the spindles 142, 148, 180 degrees until de-energized cam stop A is reached. Pin 200 momentarily operates limit switch 206 to retract the stripper bar 230 when the spindle 142 has been fully retracted. The apparatus has now completed one cycle and is in position for the commencement of the next cycle.

The above described apparatus is capable of closely controlled high speed production of small electrodes such as frame-type grids which employ extremely fine lateral wire. The useful life of the tooling employed is prolonged by attaching the lateral wire to the frame at the beginning and termination of the grid winding. The improved winding process disclosed enables the wire laying operation to be performed accurately without variation of lateral wire position.

Although one embodiment of the invention has been shown and described, it will be apparent to those skilled in the art that various changes and modifications may be made therein without departing from the scope of the invention as defined by the appended claims.

What is claimed is:

1. In a method of winding grids consisting of a helix of fine lateral wire of a given length wound about a frame, the steps of securing one end of a continuous lateral wire to the frame while arrested, slowly rotating the frame to wind the first portion of the helix of lateral wire thereon, increasing the speed of rotation of the frame to the winding speed and winding the major portion of the helix at said speed, dampening the vibration induced in the lateral wire by said winding operation, slowing the speed of rotation of the frame for the last several turns of the helix, and securing the lateral wire to the frame while arrested at the termination of the helix.

2. In a method of winding grids having a plurality of turns of lateral wire in the form of a helix wound about a frame, the steps of loading said frame upon a mandrel at a loading station, advancing said mandrel and frame from said loading station to a work station, securing one end of a continuous supply of lateral wire to said frame, winding said lateral wire about said frame by rotating said frame and moving said supply of lateral wire therealong, said frame being rotated according to a trapezoidal speed pattern wherein the first several turns of said helix are wound slowly, the main portion of the helix is wound more rapidly and the last several turns of the helix are wound slowly.

3. In a method of making grids having a plurality of turns of lateral wire in the form of a helix placed about a frame the steps of loading said frame upon a mandrel at a loading station, advancing said mandrel and frame to a work station, securing one end of a continuous supply of lateral wire to said frame while arrested, winding said lateral wire about said frame by rotating said frame and moving said supply of lateral wire therealong, said frame being rotated so that the first several turns of said helix are wound at a gradually increasing rate until the desired winding rate is reached, the major portion of the helix is wound at said winding speed and the terminal turns of said helix are wound at a decreasing rate of speed until said helix is completed, and securing said lateral wire to said frame while arrested.

4. In a method of winding grids having a plurality of turns of lateral wire in the form of a helix wound about a frame with uniform pitch the steps of loading said frame upon a mandrel at a loading station, advancing said mandrel and frame to a work station, securing one end of a continuous supply of lateral wire to said frame, winding said lateral wire about said frame with a uniform pitch by rotating said frame according to a trapezoidal speed pattern wherein the first several turns of said helix are wound slowly, the main portion of the helix is wound more rapidly and the last several turns of the helix are wound slowly, and feeding said supply of lateral wire along said rotating frame to produce said uniform pitch.

References Cited by the Examiner

UNITED STATES PATENTS

| | | | |
|---|---|---|---|
| 2,181,288 | 11/39 | Washburn | 140—71.5 |
| 2,371,782 | 3/45 | Sirp | 153—67 |
| 2,441,228 | 5/48 | Schneider et al. | 140—71.5 |
| 2,610,387 | 9/52 | Borland et al. | 29—25.17 |
| 2,801,806 | 8/57 | Taylor | 140—92.2 XR |
| 2,845,691 | 8/58 | Atherton et al. | 29—25.17 |
| 3,013,737 | 12/61 | Moore | 242—13 |
| 3,037,533 | 6/62 | Chase | 140—71.5 |

CHARLES W. LANHAM, *Primary Examiner.*

NEDWIN BERGER, RICHARD A. WAHL, *Examiners.*